US011975949B2

(12) United States Patent
Lipkowski

(10) Patent No.: US 11,975,949 B2
(45) Date of Patent: May 7, 2024

(54) GANTRY CRANE ADAPTER FOR TWO-POST LIFT

(71) Applicant: Brian Andrew Lipkowski, Valley View, OH (US)

(72) Inventor: Brian Andrew Lipkowski, Valley View, OH (US)

( * ) Notice: Subject to any disclaimer, the term of this patent is extended or adjusted under 35 U.S.C. 154(b) by 472 days.

(21) Appl. No.: 17/212,887

(22) Filed: Mar. 25, 2021

(65) Prior Publication Data

US 2021/0300732 A1 Sep. 30, 2021

Related U.S. Application Data

(60) Provisional application No. 62/994,760, filed on Mar. 25, 2020.

(51) Int. Cl.
*B66C 19/02* (2006.01)
*B66F 3/46* (2006.01)

(52) U.S. Cl.
CPC ................ *B66C 19/02* (2013.01); *B66F 3/46* (2013.01)

(58) Field of Classification Search
CPC ............ B66C 19/02; B66C 19/00; B66F 3/46
See application file for complete search history.

(56) References Cited

U.S. PATENT DOCUMENTS 3,335,674 A 8/1967 Kore
3,358,849 A 12/1967 Becker
3,797,672 A 3/1974 Vermette
4,227,464 A 10/1980 Wallace
4,378,072 A 3/1983 Appleman
4,546,852 A 10/1985 Martin
4,763,761 A * 8/1988 McKinsey ................ B66F 7/04 254/89 R
5,299,658 A * 4/1994 Cox .......................... B66F 7/04 187/209
5,657,524 A 8/1997 Kubala
5,727,656 A 3/1998 Gaudioso
(Continued)

FOREIGN PATENT DOCUMENTS

SU 1306901 4/1987

OTHER PUBLICATIONS

SU1306901A1 Machine Translation. (Year: 1987).*
(Continued)

*Primary Examiner* — Michael R Mansen
*Assistant Examiner* — Juan J Campos, Jr.
(74) *Attorney, Agent, or Firm* — Renner, Otto, Boisselle & Sklar, LLP

(57) ABSTRACT

A gantry crane adapter for a two-post lift includes a pair of angle brackets, each of which has a first, horizontal leg and second, vertical leg. The first leg includes an aperture, and a short hook extends in parallel, spaced relation along an outer surface of the second leg. The hook of each bracket is received in the slot in a carriage in a respective post of the two-post lift to removably connect each bracket to the respective carriage, with the first, horizontal legs of the respective brackets projecting toward each other. A load bearing beam is positioned across the brackets such that an internally threaded boss at each end of the beam is received in an aperture in a respective bracket, and a bolt with a washer is threaded down into the boss, to support and retain the load bearing beam across the angle brackets.

16 Claims, 8 Drawing Sheets

(56) References Cited

U.S. PATENT DOCUMENTS

| | | | | |
|---|---|---|---|---|
| 5,915,500 | A | 6/1999 | Weaver | |
| 5,954,160 | A | 9/1999 | Wells, Sr. | |
| 6,279,685 | B1 * | 8/2001 | Kogan | B66F 7/20<br>187/203 |
| 7,850,026 | B2 | 12/2010 | McKay | |
| 8,256,577 | B2 | 9/2012 | Kritzer | |
| 9,821,989 | B2 * | 11/2017 | Uhl | B66F 7/16 |
| 9,984,667 | B2 | 5/2018 | Walker | |
| 10,080,448 | B2 | 9/2018 | Kressin | |
| 10,081,524 | B2 | 9/2018 | Rucker | |
| 10,260,283 | B2 | 4/2019 | Gregory | |
| 2007/0056922 | A1 | 3/2007 | Ciaburro | |
| 2008/0035010 | A1 | 2/2008 | McKay | |
| 2009/0308994 | A1 | 12/2009 | Moore | |
| 2011/0094830 | A1 * | 4/2011 | Lund | B66F 3/46<br>187/203 |
| 2018/0265338 | A1 * | 9/2018 | Motley | B66C 5/025 |

OTHER PUBLICATIONS

Amazon listing entitled “Triumph NT-9 9000Lbs Two Post Floor Plate Auto Lift” [online]. [Retrieved on Jun. 25, 2020] retrieved from internet: <URL: https://www.amazon.com/TRIUMPH-NT-9-9000Lbs-Floor-Plate/dp/B00QHEUULM>. It is requested the U.S. Patent Office consider this reference as published more than one year prior to the filing date of the subject application.

Shop Crane™ 2000 Lbs. Capacity, 12' Span & 12' Height" [online]. [Retrieved on Jun. 25, 2020] retrieved from internet: <URL: https://www.globalindustrial.com/p/material-handling/hoists-cranes/cranes-floor-jib/shop-crane-2000-lbs-capacity-12-span-12-height>. It is requested the U.S. Patent Office consider this reference as published more than one year prior to the filing date of the subject application.

“H511-500-T49—Fixed & Adjustable Steel Gantry Cranes” [online]. [Retrieved on Jun. 25, 2020] retrieved from internet: <URL https://www.nationwideindustrialsupply.com/departments/cranes-adjustable/fixed-adjustable-steel-gantry-cranes/H511-500-T49/>. It is requested the U.S. Patent Office consider this reference as published more than one year prior to the filing date of the subject application.

“Global Industrial™ Folding Floor Crane with Telescopic Boom 4000 Lb. Capacity” [online]. [Retrieved on Jun. 25, 2020] retrieved from internet: <https://www.globalindustrial.com/p/material-handling/hoists-cranes/cranes-portable-trailer/folding-floor-crane-with-telescopic-boom-4000-lb-capacity?infoParam.campaignId=T9F&gclid-EAlalQobChMI3b329uqV4QIVDCCtBh25AAtlEAQYASABEgJFdPD_BwE>. It is requested the U.S. Patent Office consider this reference as published more than one year prior to the filing date of the subject.

“Pittsburgh Automotive 1 ton Capacity Telescoping Gantry Crane” [online]. [Retrieved on Jun. 25, 2020] retrieved from internet: <https://www.harborfreight.com/1-ton-capacity-telescoping-gantry-crane-62510.html>. It is requested the U.S. Patent Office consider this reference as published more than one year pnor to the filing date of the subject application.

* cited by examiner

GANTRY CRANE ADAPTER FOR TWO-POST LIFT

BACKGROUND

Two-post car lifts are widely used in garages during the repair of vehicles. A two-post lift generally comprises a pair of vertical posts which are spaced an appropriate distance apart from each other to receive a vehicle therebetween. The posts are fixed to the floor of the garage such as by anchor bolts, whereby the posts are securely supported in an upright position.

A pair of carriages are provided, with each carriage associated with one of the posts. The posts can be hollow, and the carriages can be supported and moveable internally within the posts. The carriages can be mounted on hydraulic or pneumatic cylinders, or otherwise supported and move-able by mechanisms such as cables and gears, to adjust the vertical positioning of the carriages within the posts.

Devices such as V-shaped adjustable swing arms can be attached to the carriages, and positioned such that the arms, when the carriages are near the floor, can be received under a vehicle, and the devices then adjusted to vertically raise the arms, and hence lift the appropriate portion of the vehicle to a selected height, to perform work under or on the vehicle. The swing arms are typically connected to the bottom portion of the carriages such as with removable pins. U.S. Pat. No. 10,081,524 generally shows such a two-post lift system. It is also known to have a beam fixed to and extending between the carriages and likewise positioned under a vehicle to lift the vehicle. Such a system is shown in U.S. Pat. No. 5,299,658.

While commonplace, such lifts take up significant space in the garage and are expensive to procure.

Another common useful system in a garage is a gantry crane. Such a crane typically comprises a pair of vertical posts spaced an appropriate distance apart from one another and fixed relative to the floor or securely supported on casters, and a horizontal, load-bearing beam which extends between and interconnects the upper ends of the posts. The load-bearing beam is fixed at a predetermined height above the ground, and a beam trolley can be located along the beam and moved from one end to the other to be appropriately located over a vehicle or other heavy machinery or equipment. The beam trolley conventionally includes a chain and hoist system including a hook, which can be used to vertically lift a heavy part, such as an engine out of the front of a vehicle.

The gantry crane also takes up a significant amount of space in a garage, and also can be expensive to procure.

Each of the two-post lift and gantry crane have their useful applications in a repair shop or other facility, and technicians generally need both types of systems to provide full service on vehicles. The two-post lift vertically lifts and supports heavy components from below; while the gantry beam vertically lifts heavy components from above. However, as indicated above, it is expensive to procure each of these systems, and also to obtain the necessary space for their safe operation. It is therefore believed there is a demand for a less expensive, more compact solution for lifting and supporting vehicles from below, as well as for lifting heavy components from above.

SUMMARY

A gantry crane adapter is provided which enables a two-post lift to be easily converted into a gantry crane. The gantry crane adapter is simple to install on the two-post lift and can be used to vertically lift heavy parts and equipment from above, such as an engine from a vehicle. The adapter can be easily removed from the two-post lift, and the two-post lift can then be used in a conventional manner to lift and support vehicles or other heavy components from below. The combined solution saves a considerable amount of money and space in a garage, as compared to separate and independent two post lifts and gantry cranes.

The gantry crane adapter includes a pair of angle brackets, each of which includes a first, horizontal leg, and a second, vertical leg, extending substantially perpendicular to the horizontal leg. A first connector device, for example an aperture, is provided in the first, horizontal leg. Each bracket further includes a hook for removably connecting the bracket to a carriage. The hook can comprise an L-shaped body, with one of the legs of the body laying flat against the first, horizontal leg of the bracket and fixed thereto such as by welding, and the other leg extending in parallel, spaced-apart relation along a portion of the outer surface of the second, vertical leg. The hook of each bracket is configured to be received in an opening in the upper portion of the carriage of a respective post of the two-post lift. The hooks removably connect each bracket to the respective carriage with the first, horizontal legs of the respective brackets projecting toward each other.

The gantry crane adapter further includes a load bearing beam. The beam includes a second connector device, for example an internally-threaded boss, at each end of the beam. The beam is positionable with respect to the angle brackets such that the bosses on the ends of the beam are each received in an aperture in a respective bracket. A bolt with a washer can then be received in the boss and tightened down against the bracket to support and retain the load bearing beam across the angle brackets.

Finally, a beam trolley with a conventional chain and hoist system including a hook, can be provided along the load bearing beam of the gantry crane adapter.

The gantry crane adapter can be easily assembled on the two-post lift by inserting the hook of each bracket into the slot on each carriage of the two-post lift, lifting and positioning the two-post beam across the brackets, and then tightening down the bolts into the bosses at each end of the beam. The gantry crane adapter can then be used as a conventional gantry crane to vertically lift heavy components, such as by operating the hoist of the beam trolley, and/or by vertically moving the carriages of the two-post lift to lift the beam and beam trolley.

To remove the gantry crane adapter, the process is simply reversed by removing the bolts from the ends of the beam, removing the beam from across the brackets, and then removing the brackets from the carriages. The two-post lift can then again be used in a conventional manner. When not in use, the beam can be easily stored such as by strapping, lashing or otherwise hanging or fixing the beam along and against one of the posts of the two-post lift to free up valuable floor space. As the gantry crane adapter is in essence only three relatively low-cost components, the gantry crane adapter provides a low-cost solution to having both a two-post lift and gantry crane available on a shop floor.

DETAILED DESCRIPTION

Figure 1:
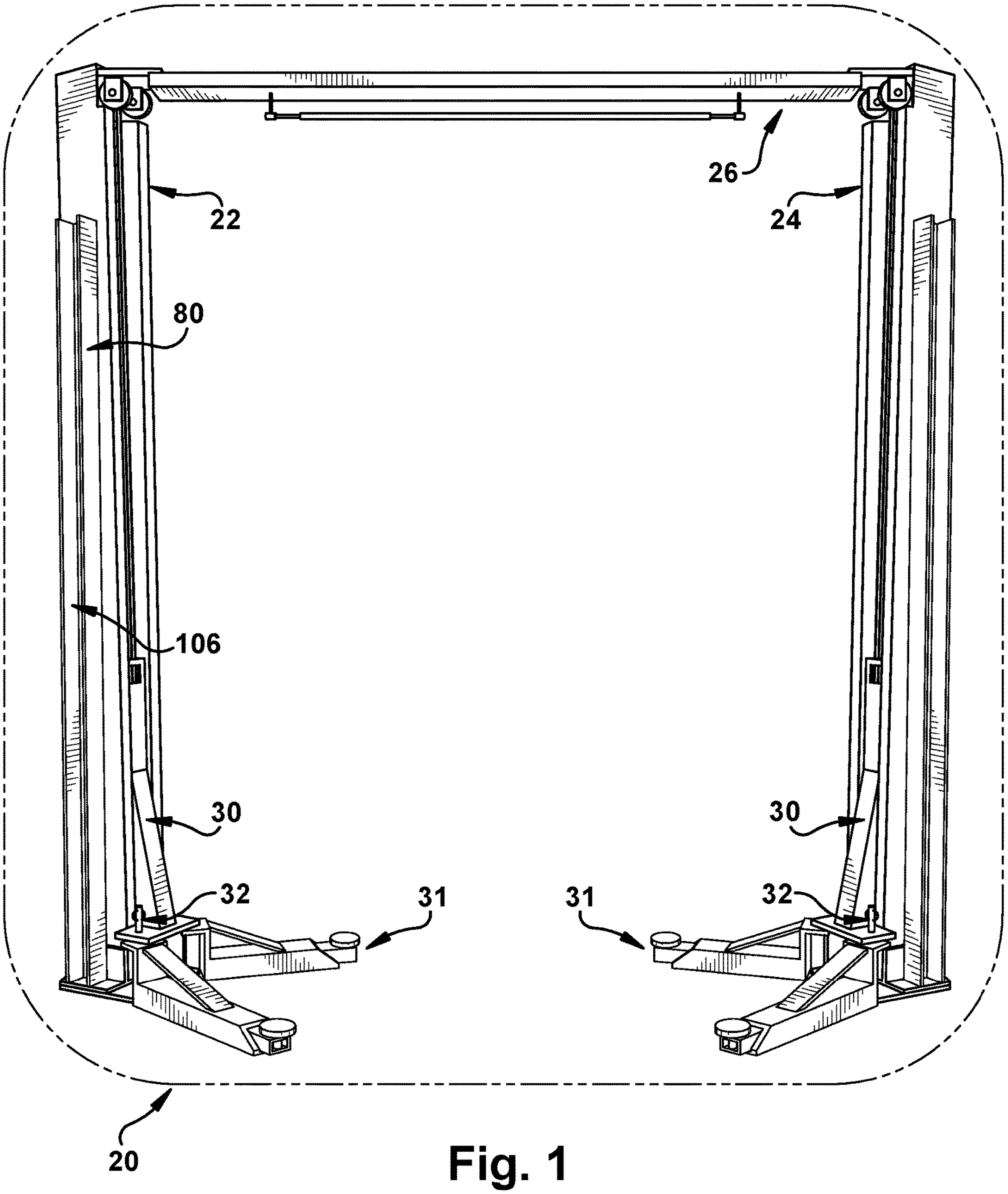
FIG. 1 is a side perspective view of a two-post lift.

Referring to the drawings and initially to FIG. 1, a conventional two-post lift is indicated generally at 20. The two-post lift typically includes a pair of elongated post assemblies 22, 24, each of which is vertically oriented and spaced-apart from each other an appropriate distance, for example, a sufficient distance to receive a car or truck therebetween. The post assemblies are connected across their upper ends by a connecting channel 26. The connecting channel 26 is securely fixed to each of the post assemblies, using bolts and/or other conventional fasteners. Each of the post assemblies can likewise be fixed to the floor of the garage or shop in a conventional manner, for example with anchor bolts sunk into the floor, such that the two-post lift is rigidly maintained in an upright position and is secure enough to support a heavy vehicle.

Figure 2:
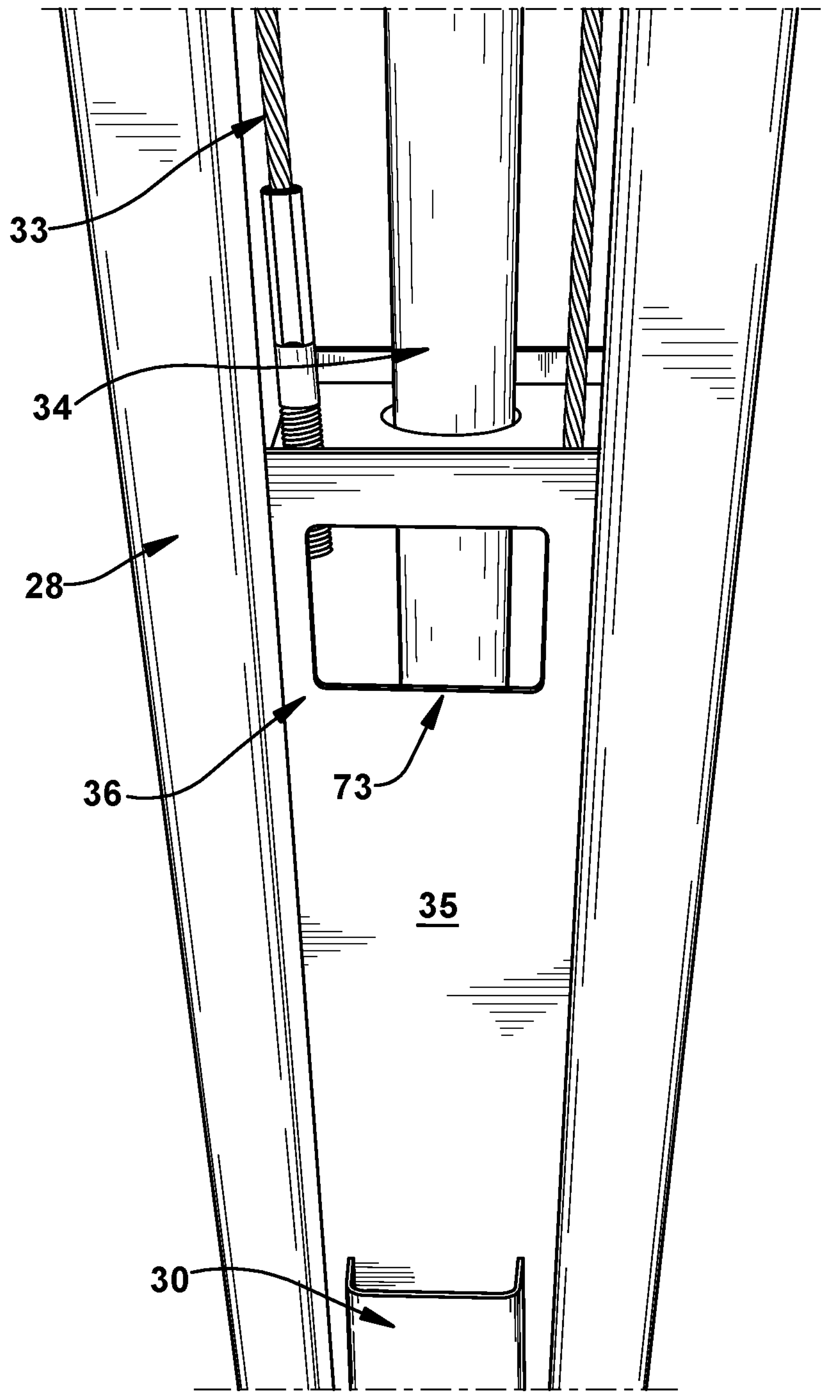
FIG. 2 is an enlarged front view of one of the post assemblies of the two-post lift, the other post assembly being identical.

Referring now also to FIG. 2, each of the post assemblies 22, 24 typically consists of a hollow column 28, which supports a carriage, indicated generally at 30, for vertical travel along the vertical length of the posts. The carriages normally each support a device such as a V-shaped adjustable swing arm as at 31 (FIG. 1), which is a well-known device easily located under the frame of a vehicle, with the arms spread apart for engaging and supporting the underside of the frame. The swing arms are typically connected toward the bottom of the carriages for example with removable pins 32, whereby the arms can be connected and disconnected from the carriages as appropriate, such as for repair or replacement.

The carriages are each connected by cables or chains as at 33, and driven by hydraulic or pneumatic cylinders as at 34, or other lifting mechanisms such as gears and/or pulleys, to move the carriages vertically up and down along the vertical length of the post assemblies. Appropriate manual or automatic controls (not shown) can be provided to operate the cylinders, with the carriages moving in unison along the length of the post assemblies. As the carriages are moved vertically along the post assemblies, the swing arms 31 elevate the appropriate portion of the vehicle from below, such that the vehicle can be easily accessed and serviced. A conventional two-post lift appropriate for the subject invention is described in U.S. Pat. No. 10,081,524, which is incorporated herein by reference. It should be appreciated, however, that the referenced two-post lift is but one example of a two-post lift appropriate for the present invention.

As shown in FIG. 2, each of the carriages 30 includes a front plate 35, having a square or rectangular opening or slot, such as indicated generally at 36, near the upper end of the carriage. Such an opening is conventional in many carriages, and allows access to the connected ends of the supporting cables 33 for equalization adjustment of the carriages. The posts are oriented such that the openings 36 in the respective carriages face each other across the two-post lift.

Figure 3:
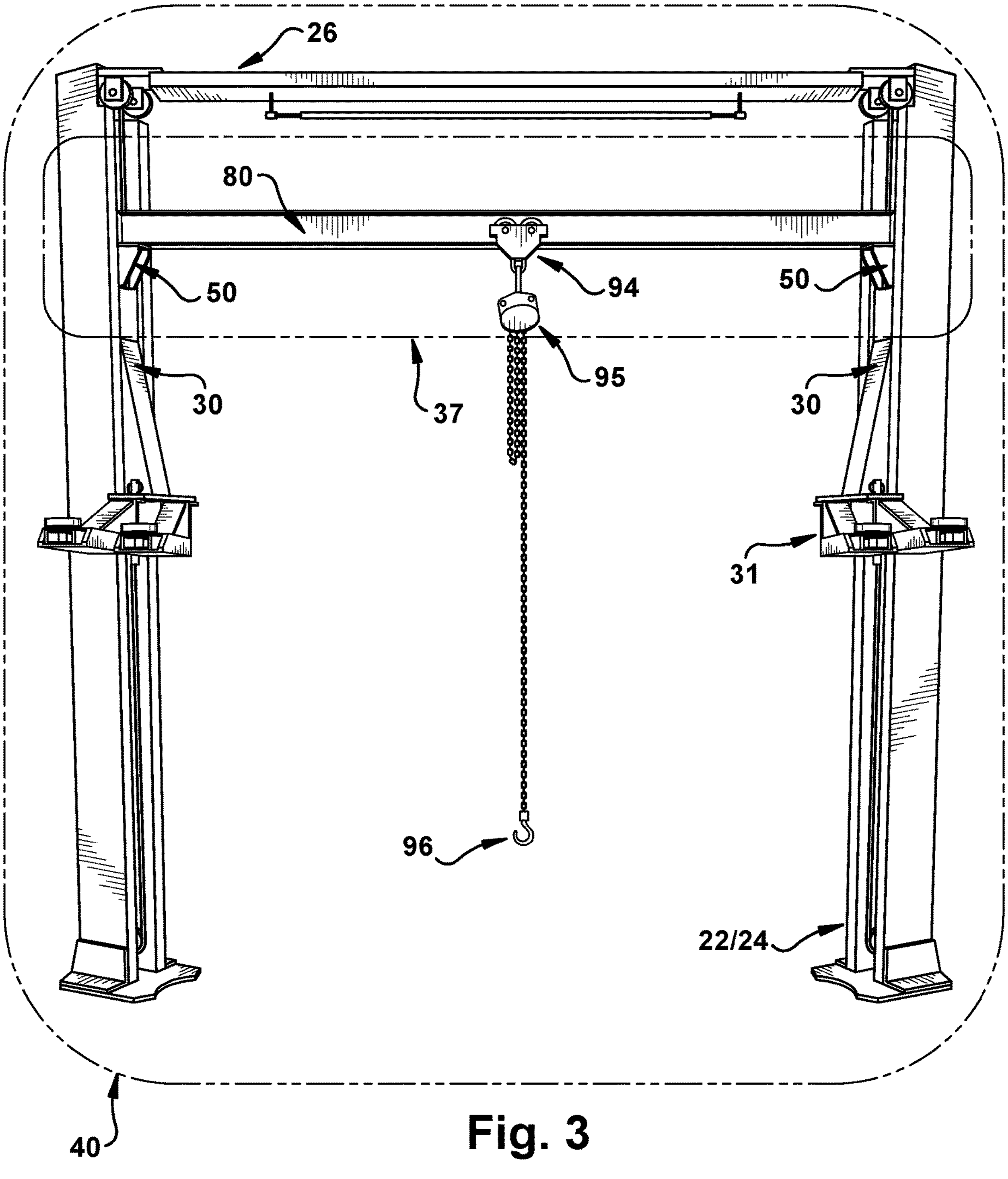
FIG. 3 is a side perspective view of a lift assembly of the present invention, including a two-post lift and gantry crane adapter.

Referring now to FIG. 3, a gantry crane adapter, indicated generally at 37, can be combined with the two-post lift 20, to make a lift assembly 40. As will be described below, the gantry crane adapter easily converts the two-post lift into a gantry crane, and saves space and expense as compared to separate two-post lifts and gantry cranes.

Figure 4:
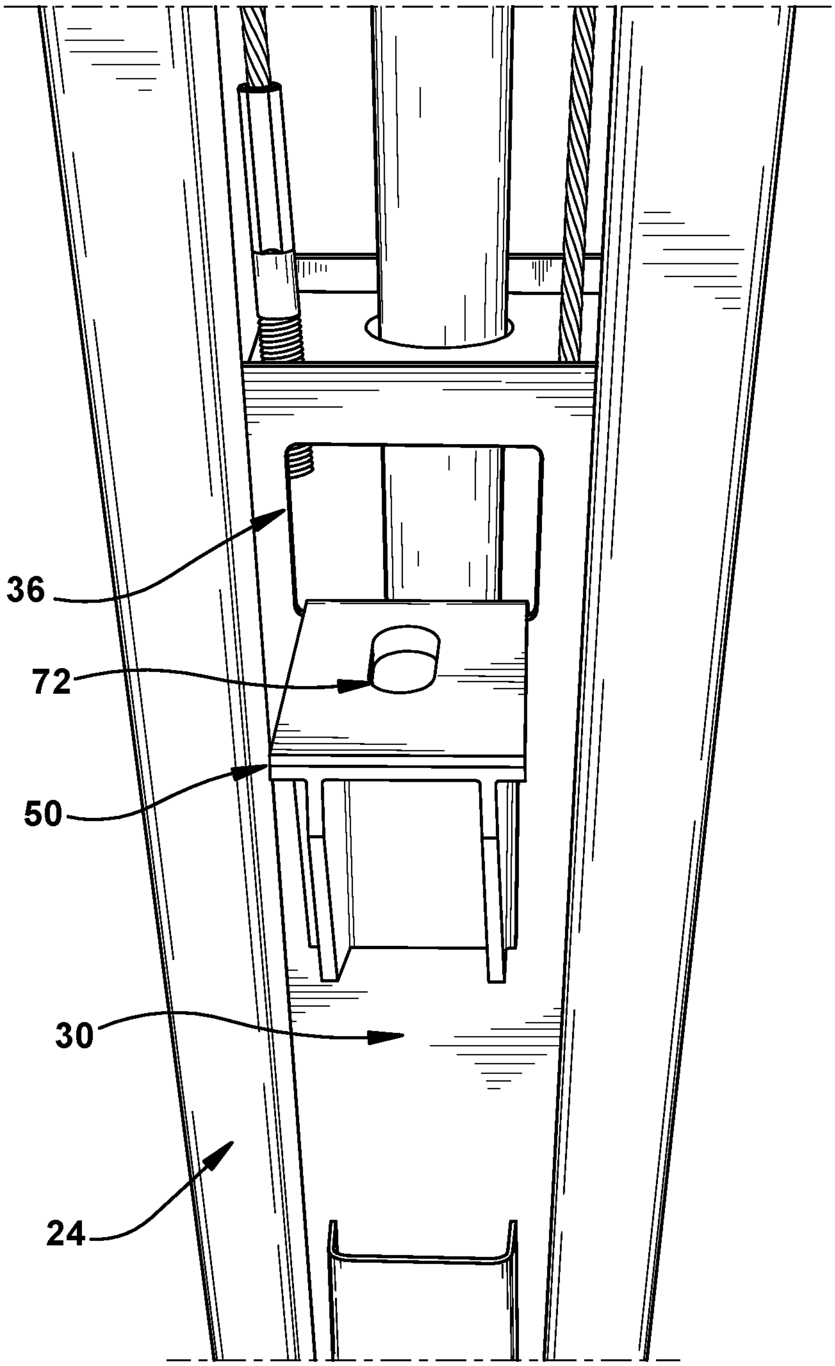
FIG. 4 is an enlarged, elevated perspective view of a bracket installed in the carriage assembly within the post of FIG. 2.
Figure 5:
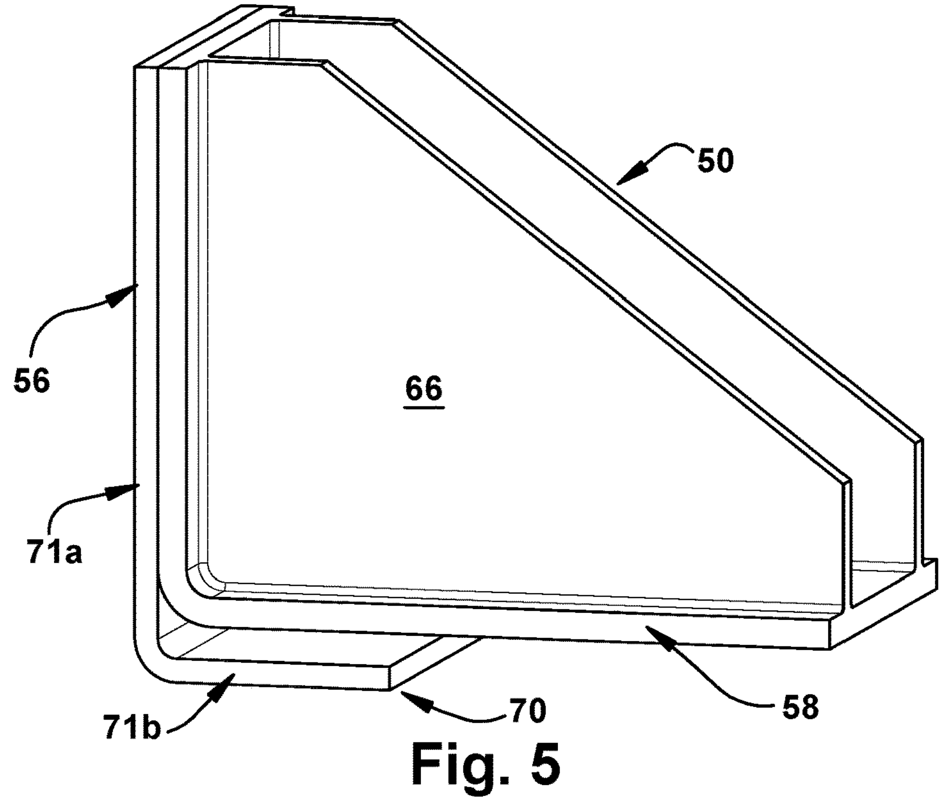
FIG. 5 is a side view of the bracket of FIG. 4.
Figure 6:
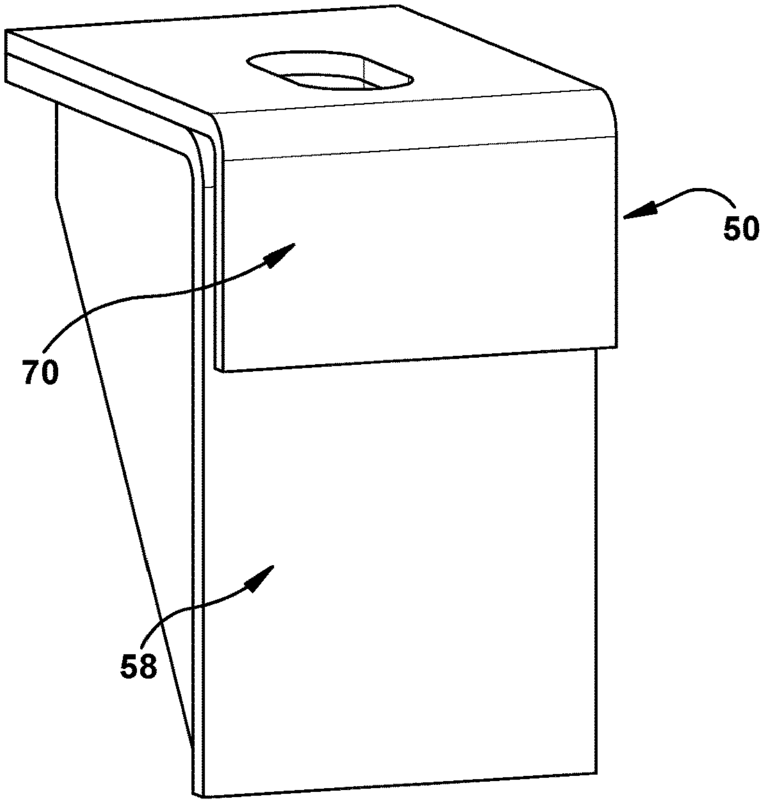
FIG. 6 is a rear view of the bracket of FIG. 4.
Figure 7:
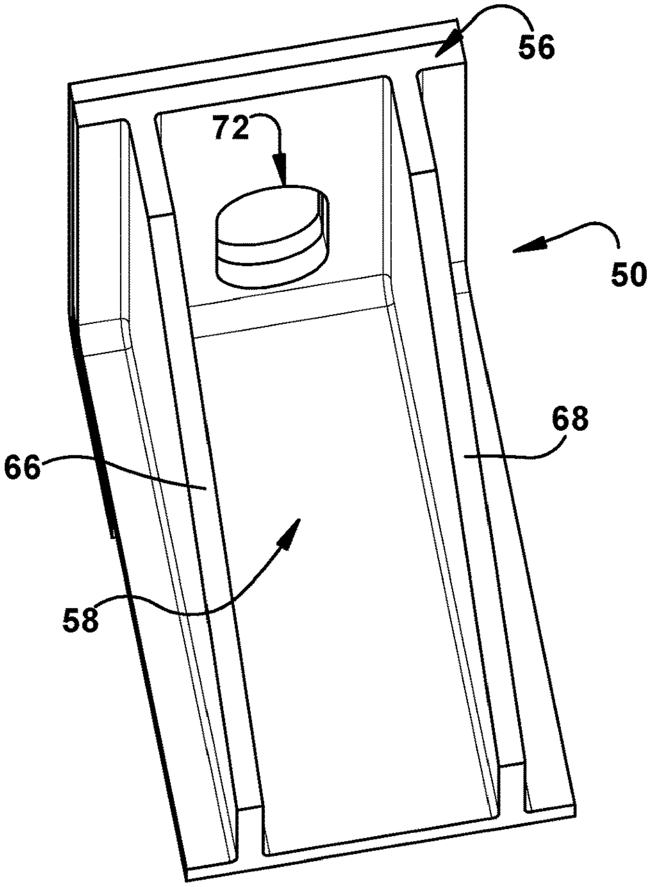
FIG. 7 is a front view of the bracket of FIG. 4.
Figure 8:
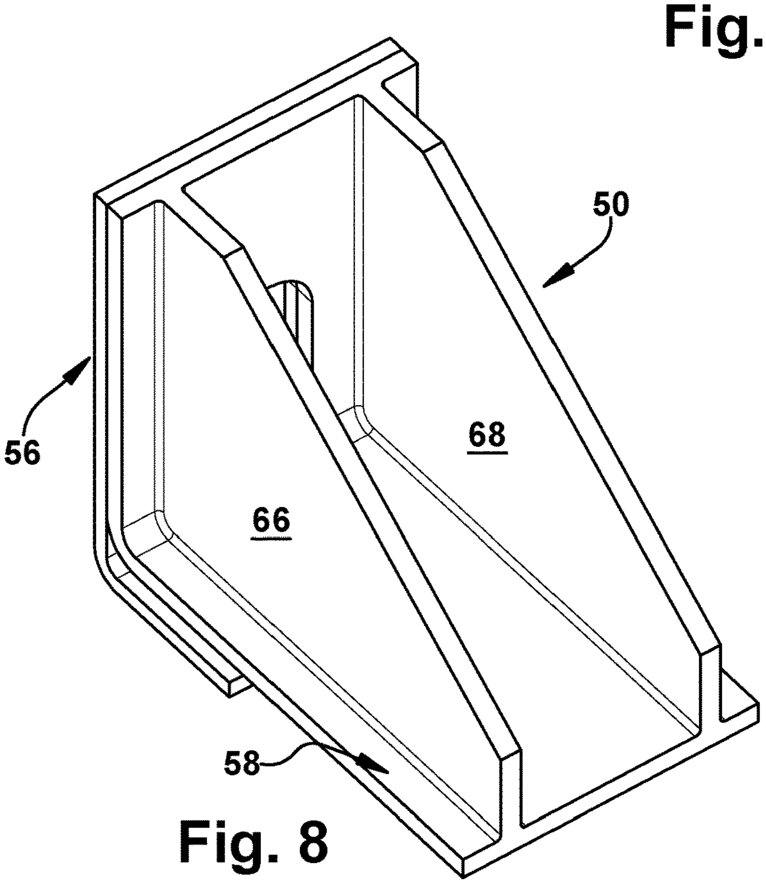
FIG. 8 is a perspective view of the bracket of FIG. 4.

Referring now also to FIGS. 4-8, the gantry crane adapter 37 includes a pair of metal angle brackets, indicated generally at 50, each of which are removably fixed to a respective carriage 30 in the post assemblies 22, 24. For example, as shown in FIG. 4, bracket 50 is fixed to the carriage 30 in post assembly 24, and as such, moves vertically in conjunction therewith. Each bracket comprises a thin, flat rectangular metal strip or plate, bent in the middle to form a first, horizontal leg 56, and a second, vertical leg 58, which extend substantially perpendicular to one other. Two identical triangular shaped plates 66, 68 are connected such as by welding, in a spaced-apart, parallel, manner to the inner surfaces of the legs 56, 58, to provide support to resist bending under load.

A hook 70 is provided along the length of the second, vertical leg 58. Preferably the hook comprises an L-shaped body formed from a flat rectangular metal strip or plate, with one of the legs 71*a* of the body laying flat against the first, horizontal leg 56 of the bracket and fixed thereto such as by welding; and with the other leg 71*b* extending parallel to the second, vertical leg 58, in close, but spaced-apart relation thereto, and extending toward the lower end of the leg. Hook 70 is preferably a single unitary piece; however, it could likewise be formed of multiple pieces, such as two hook members spaced-apart along the vertical leg 58, and it could be likewise be connected directly to vertical leg 58 along the length of the leg, rather than to horizontal leg 56. It is merely necessary that hook 70 extend along at least a portion of vertical leg 58, and open toward the lower end of the bracket.

Finally, each bracket includes a first connector device, such as an elongated hole or aperture as at 72, formed by machining through the horizontal leg 56 at approximately the midpoint of the leg, and between the support plates 66, 68.

As can be seen in FIG. 4, bracket 50 fits within the opening 36 in each carriage, with hook 70 being received over the bottom lip 73 (FIG. 2) of the opening. The bracket is then slid downward such that the bracket hangs on the carriage. When assembled, the outer surface of vertical leg 58 is in surface-to-surface engagement against the front plate 35 of the carriage. The bracket can be easily inserted into and removed from the opening by sliding the hook over the bottom lip 73 (FIG. 2), with the weight of the bracket holding the bracket down securely against the carriage.

The vertical length of the hook 70 can be chosen to allow the hook to be easily inserted into the opening 36, and yet provide sufficient support for the bracket once connected to the carriage. Preferably the hook 70 extends from the horizontal leg to a distal edge located slightly less than the midpoint of the vertical leg, or in other words, the hook extends less than the majority of the length of the vertical leg, although the hook could be slightly shorter or longer as should be appreciated by those skilled in the art; and in any event, the hook is generally chosen to be slightly less than the vertical dimension of the opening 36 in the carriage such that the hook can be easily inserted into and removed from, the opening.

Referring again to FIG. 3, the gantry crane adapter assembly 37 further includes a load-bearing beam as at 80. Load bearing beam 80 is preferably an I-beam, and is configured to be supported across brackets 50.

Figure 9:
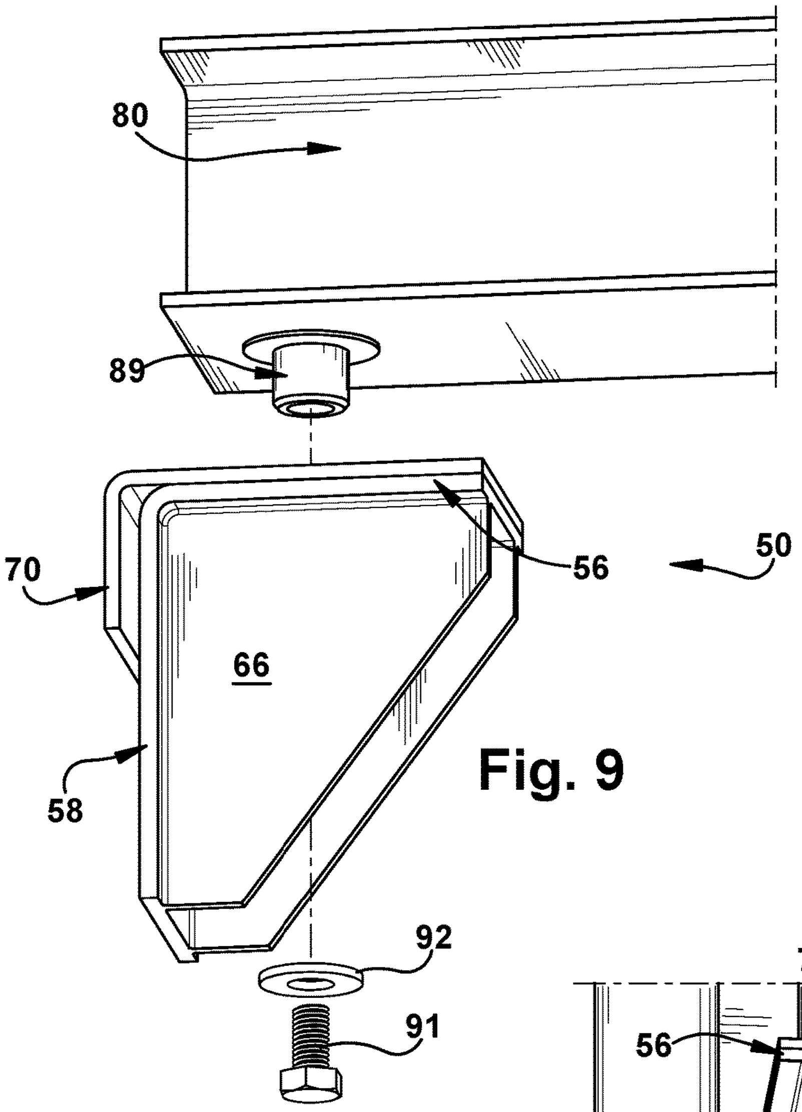
FIG. 9 is an exploded view of the bracket and an end of the beam for the gantry crane adapter of FIG. 3.
Figure 10:
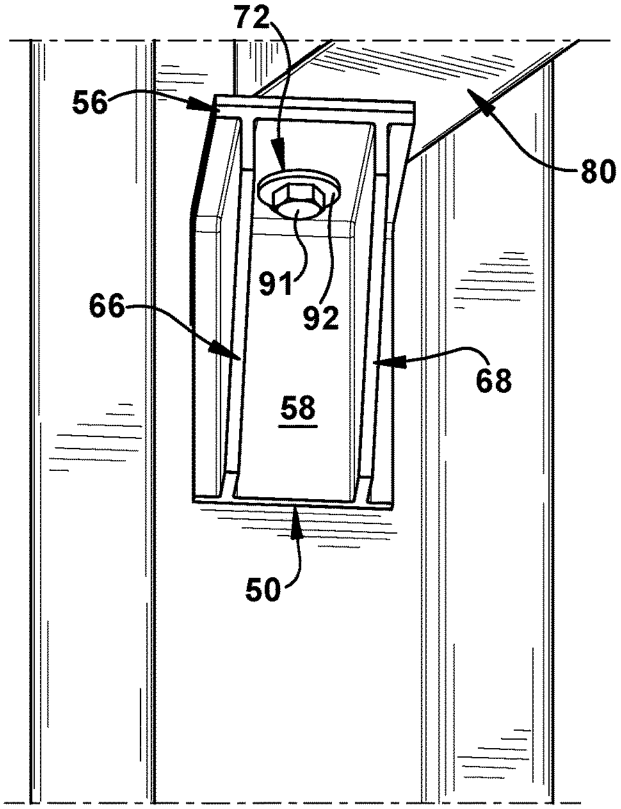
FIG. 10 is a front view of the beam and bracket installed on the two-post lift of FIG. 3.

Referring to FIGS. 9 and 10, a second connector device such as an internally-threaded boss 89 can be welded or otherwise fixed directly to the end of the beam. The boss 89 is positioned relative to the brackets such that the boss is received within aperture 72. A bolt 91 with washer 92 is then received within the boss 89, and tightened down against the underside of the horizontal bracket leg 56 (FIG. 10) to fix the end of the beam to the associated bracket, with the bottom surface of the beam flush against the upper surface of the horizontal leg of the bracket. The boss 89 facilitates locating the end of the beam 80 properly within the aperture 72 of the bracket 50 prior to fastening. While it is preferred that boss 89 is fixed to beam 80 and aperture 72 is formed in the horizontal leg 56; the location of these components could be reversed, that is, with a boss on the upper surface of the horizontal leg received within an aperture in the end of the beam.

Referring again to FIG. 3, after each end of the beam is fixed to the associated bracket, a beam trolley 94 and chain hoist 95 can be located along the load bearing beam 80. The beam trolley and chain hoist can be any appropriate, commercially-available lift assembly as should be known and appreciated by those skilled in the art. The beam trolley typically includes one or more wheels supported within a frame, while the chain hoist includes a pully and chain system which allows a hook 96 to be appropriately raised and lowed upon manipulation of the chain.

Once the gantry crane adapter 37 is fixed across the brackets, the lifting mechanism for the carriages can be operated to bring the carriages 30, and hence the load bearing beam 80, to an appropriate height. The swing arms 32 can be removed before such operation, or simply moved out of the way, as illustrated. A vehicle can be located under the beam, and the beam trolley/chain hoist 94, 95 located and manipulated as appropriate to raise and lower the hook 96 so as to enable the raising and lowering of a component of the vehicle, such as an engine.

Figure 11:
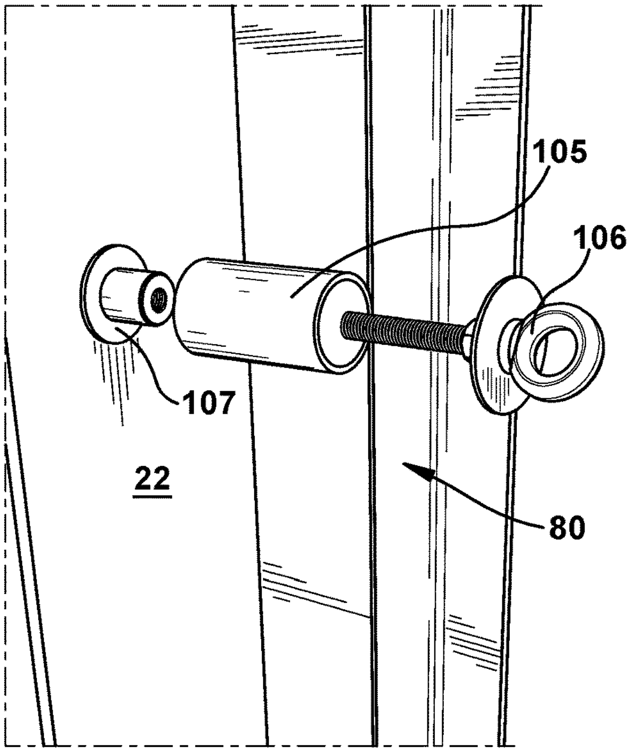
FIG. 11 is an exploded perspective view of the beam storage attachment components of FIG. 1.
Figure 12:
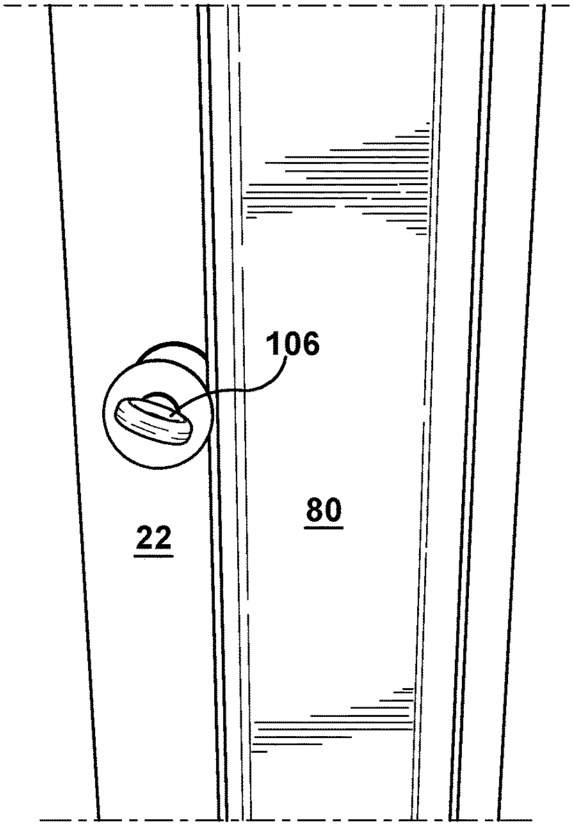
FIG. 12 is an enlarged side view of the beam fixed to a post in stowed configuration of FIG. 1.

Once the use of the gantry crane adapter is finished, the beam 80 can be removed from the brackets by removing the bolt and washer 91, 92, and the beam can be stored. As shown in FIG. 1, the beam can be oriented vertically, and strapped, lashed or otherwise hung or fixed to one of the posts. Referring now also to FIGS. 11 and 12, as one example, a ring 105 can be attached such as by welding to the upper side of the beam 80, and a threaded eye bolt as at 106 can be received through the ring and through a corresponding threaded securing post 107 mounted along the length of the post 22. The eye bolt is then tightened down to retain the load bearing beam against the column. The brackets 50 can then be removed, if desired, from their associated openings 36 in the carriages 30 and stored as appropriate, at which point the remaining two-post lift can be used in a conventional manner.

As should be appreciated by the above, the lift assembly with two-post lift and gantry crane adapter provides a low-cost solution to having both a two-post lift and gantry crane available on a shop floor, and frees up valuable shop space as compared to separate two-post lifts and gantry crane adapters.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A gantry crane adapter for a two-post lift, wherein each post of the lift includes a vertically-moveable carriage with an opening, the gantry crane adapter comprising:

a. a pair of angle brackets, each of which includes a first, horizontal leg and a second, vertical leg extending substantially perpendicular to the first leg, and each bracket further including: i) a first connector device along the first leg, and ii) a hook extending in parallel spaced relation along an outer surface of the second leg, the hook of each bracket configured to be received in the opening in a respective carriage to removably connect the bracket to the respective carriage; and b. a load bearing beam, the beam including a second connector device at each end of the beam, the beam positionable with respect to the angle brackets such that the first connector device on each bracket cooperates with the second connector device on a respective end of the beam to support and retain the load bearing beam across the angle brackets when the brackets are connected to the respective carriages.

2. The gantry crane adapter as in claim 1, wherein the first leg, second leg and hook are integrally connected to one another.

3. The gantry crane adapter as in claim 1, wherein the first connector device on each bracket comprises an aperture through the first leg, and the second connector device on each end of the beam comprises a boss.

4. The gantry crane adapter as in claim 3, and further including a bolt and washer, with the bolt receivable within the boss to fix the beam to the respective bracket.

5. The gantry crane adapter as in claim 1, wherein the hook opens toward a lower end of the second leg of each respective bracket.

6. The gantry crane adapter as in claim 5, wherein the hook extends less than the majority of the length of the second leg of each respective bracket.

7. The gantry crane adapter as in claim 1, further including support plates extending between inner surfaces of the first and second legs of each respective bracket.

8. A lift assembly, comprising:

a. a two-post lift, wherein each post of the lift includes a vertically-moveable carriage with an opening, with the posts located such that the opening in the carriage of one post faces the opening in the carriage of an opposite post, and b. a gantry crane adapter having i) a pair of brackets, each of which includes a first connector device and a hook, the hook of each bracket received in the opening in a respective carriage to removably connect each bracket to the respective carriage; and ii) a load bearing beam, the beam including a second connector device at each end of the beam, the beam positioned with respect to the brackets with the second connector device at each end of the beam cooperating with the first connector device in a respective bracket to support and retain the load bearing beam across the brackets.

9. The lift assembly as in claim 8, wherein the first connector device on each bracket comprises an aperture, and the second connector device on each end of the beam comprises a boss, the boss at each end of the beam received in the aperture in the respective bracket.

10. The lift assembly as in claim 9, and further including a bolt and washer, with the bolt received within the boss to fix the beam to the respective bracket.

11. The lift assembly as in claim 8, further including a beam trolley and chain hoist supported along the length of the load bearing beam.

12. A lift assembly, comprising:

a. a two-post lift, wherein each post of the lift includes a vertically-moveable carriage with an opening, with the posts located such that the opening in the carriage of one post faces the opening in the carriage of an opposite post, and b. a gantry crane adapter having i) a pair of angle brackets, each of which includes a first, horizontal leg and a second, vertical leg extending substantially perpendicular to the first leg, each bracket further including an aperture along the first leg, and a hook extending in parallel, spaced relation along an outer surface of the second leg, the hook of each bracket received in the opening in a respective carriage to removably connect each bracket to the respective carriage with the first legs of the respective brackets projecting toward each other; and ii) a load bearing beam, the beam including an internally threaded boss at each end of the beam, the beam positioned with respect to the angle brackets with the bosses at each end of the beam received in aperture in a respective bracket to support and retain the load bearing beam between the angle brackets.

13. The lift assembly as in claim 12, and further including a bolt and washer, with the bolt received within the boss to fix the beam to the respective bracket.

14. The lift assembly as in claim 12, wherein the hook opens toward a lower end of the second leg of each respective bracket.

15. The lift assembly as in claim 14, wherein the hook extends less than a majority of the length of the second leg of each respective bracket.

16. The lift assembly as in claim 12, further including a beam trolley and chain hoist supported along the length of the load bearing beam.

* * * * *